United States Patent
Ritvanen et al.

(10) Patent No.: US 12,517,025 B2
(45) Date of Patent: Jan. 6, 2026

(54) METHOD AND APPARATUS FOR DETERMINING PROPERTIES OF HYGROSCOPIC MATERIAL IN REAL-TIME DURING MODIFICATION

(71) Applicant: AVANT WOOD OY, Kuopio (FI)

(72) Inventors: Pekka Ritvanen, Kuopio (FI); Jyrki Lehtinen, Haukivuori (FI); Timo Pasanen, Kuopio (FI); Kari Säynevirta, Kuopio (FI); Kari Tervo, Kuopio (FI)

(73) Assignee: Avant Wood Oy, Kuopio (FI)

( * ) Notice: Subject to any disclaimer, the term of this patent is extended or adjusted under 35 U.S.C. 154(b) by 257 days.

(21) Appl. No.: 18/277,578

(22) PCT Filed: Feb. 16, 2021

(86) PCT No.: PCT/FI2021/050106
§ 371 (c)(1),
(2) Date: Aug. 16, 2023

(87) PCT Pub. No.: WO2022/175585
PCT Pub. Date: Aug. 25, 2022

(65) Prior Publication Data
US 2024/0125684 A1    Apr. 18, 2024

(51) Int. Cl.
*G01N 5/02*     (2006.01)
(52) U.S. Cl.
CPC .................... *G01N 5/025* (2013.01)

(58) Field of Classification Search
CPC ............................ G01N 5/025; G01N 5/045
See application file for complete search history.

(56) References Cited

U.S. PATENT DOCUMENTS 9,156,185 B2 * 10/2015 Bendiktsen ............ B27K 3/025

FOREIGN PATENT DOCUMENTS

| CN | 108254281 A | * | 7/2018 | ............ G01G 11/00 |
| WO | 2010076394 A1 | | 7/2010 | |

* cited by examiner

*Primary Examiner* — Jamel E Williams
(74) *Attorney, Agent, or Firm* — Saltamar Innovations; Shalom Wertsberger

(57) ABSTRACT

The invention relates to a method for determining properties of hygroscopic material in real-time during modification wherein, in the method, pieces of hygroscopic material to be modified are stacked and a batch of the hygroscopic material (15) being thereby formed is placed in a modification chamber (11) of a modification apparatus (10) wherein the pieces of the hygroscopic material to be modified are modified. In the method according to the invention at least weight, volume, amount of water in the batch of the hygroscopic material as well as average moisture content of the batch of the hygroscopic material (15) are determined before modification and/or at least once during and/or after modification of the batch of the hygroscopic material (15). The invention relates also to an apparatus for determining properties of hygroscopic material in real-time during modification of the batch of the hygroscopic material (15).

6 Claims, 1 Drawing Sheet

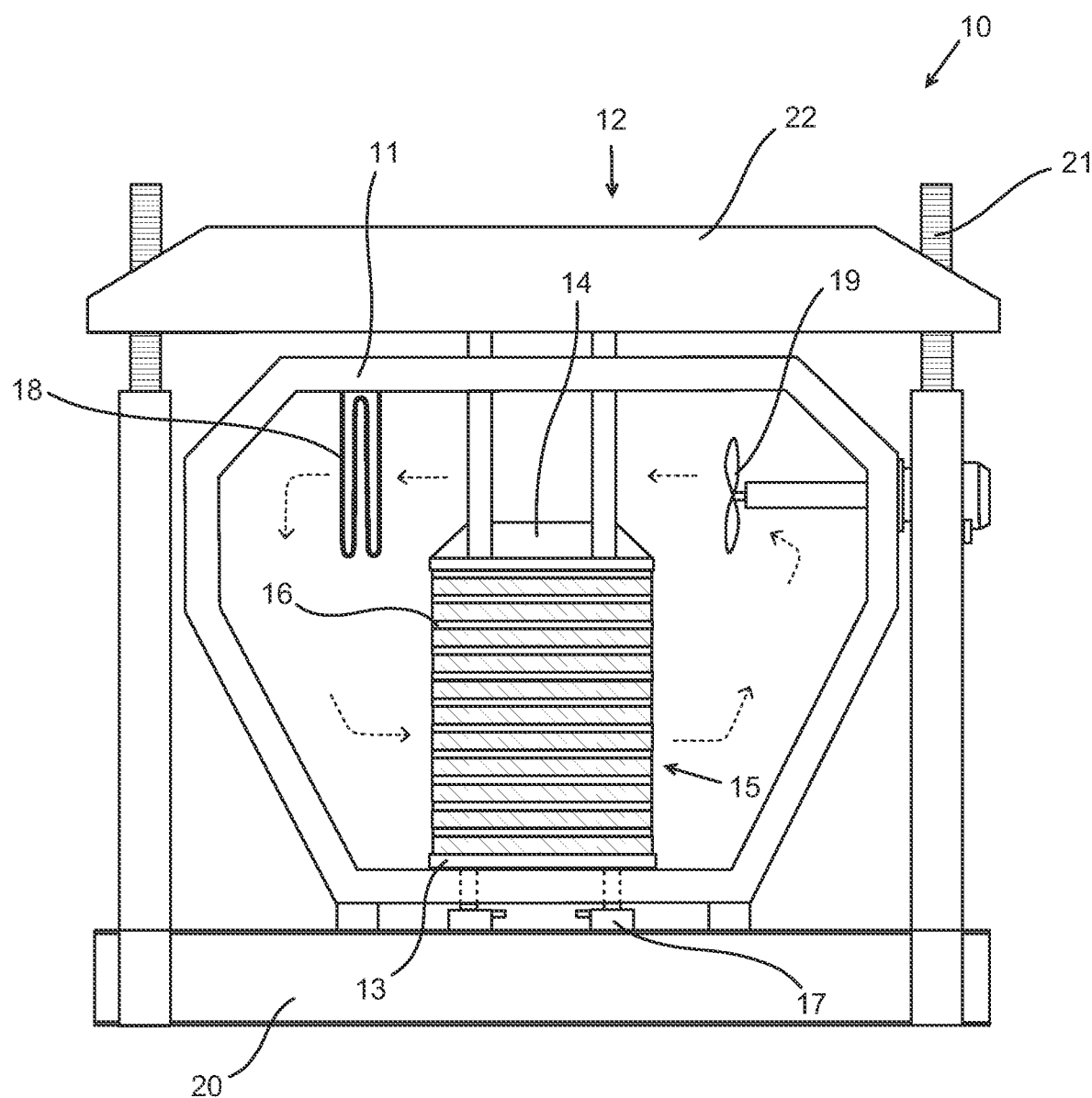

METHOD AND APPARATUS FOR DETERMINING PROPERTIES OF HYGROSCOPIC MATERIAL IN REAL-TIME DURING MODIFICATION

TECHNICAL FIELD

The invention relates to a method and apparatus for determining properties of hygroscopic material in real-time during modification.

BACKGROUND

Hygroscopic materials are materials having ability to absorb and store moisture from the surrounding air. When the relative humidity changes, a difference in the vapour partial pressure results in the material absorbing or desorbing moisture in order to reach equilibrium. Due to their properties hygroscopic materials have lots of applications in different branches of industry. For instance, in construction industry hygroscopicity of the wall material is an advantage since it aids in controlling the room air quality by absorbing moisture during wet conditions and extracting moisture when the outside air is dry and/or the outside temperature is low. Wood is a natural industrially applicable hygroscopic material that is subjected to different conditions relating the surrounding air relative humidity during its use. Also when sawn wood or timber is processed in order to utilize it in construction or furniture industry it is typically dried in order to achieve desired moisture content depending on the respective quality requirements of that specific purpose of use. Another hygroscopic material being widely used in the industry is concrete.

When utilizing hygroscopic materials industrially these are typically subjected to different air humidity conditions during their manufacturing processes. For instance in timber manufacturing sawn wood is at first dried by an arrangement wherein the wood pieces in question are placed in one or more drying chambers wherein each an appropriate conditions relating temperature and relative humidity of air is maintained depending on the wood moisture content at each phase of the handling process.

A known method for monitoring and controlling modification process of hygroscopic material is described in an international patent application publication WO 2010/076394.

SUMMARY

The object of the present invention is to provide a new method for determining properties of hygroscopic material in real-time during a modification process in a modification apparatus that is simpler, easier to implement in to a production of modified pieces of hygroscopic material as well as that is more reliable and cost effective than the known methods. Furthermore, the object of the invention is to introduce a new method by means of which hygroscopic material can be modified in such a way that the modified hygroscopic material meets all the quality requirements of an end-user whose products raw-material has predetermined specific requirements relating dimensional stability and accuracy, surface quality, weather-resistance as well as strength and durability of the material.

The aim of the invention is achieved by a method wherein hygroscopic material pieces have been stacked and placed into a modification chamber during the modification process and wherein the method comprises at least following steps:

before modification the initial weight of the batch of the hygroscopic material in the modification chamber is determined by measuring the weight of the batch of the hygroscopic material in the modification chamber before start of the modification and weight at least once during and/or after the modification, the initial volume of the batch of the hygroscopic material to be modified is determined by measuring at least one dimension of the batch of the hygroscopic material in the modification chamber, the weight of the respective batch of the dry hygroscopic material is determined by multiplying the determined initial volume of batch of the hygroscopic material with the density of the dry hygroscopic material, the amount of water in the batch of the hygroscopic material and its average moisture content before modification and at least once during and/or after the modification are determined by subtracting the calculated weight of the batch dry hygroscopic material having corresponding volume from the measured weight of the batch of the hygroscopic material before modification and during and/or after the modification.

The advantage of the method according to the invention is that by the method according to the invention properties of hygroscopic material to be modified can be determined by means of method that is simpler, easier to implement to a production plant producing modified pieces of hygroscopic material as well as that is more reliable and cost effective. Especially, it is possible to measure, among others, moisture content of the hygroscopic material and amount of water in hygroscopic material without any moisture measurement sensor or corresponding physical measurement device. Furthermore, the advantage of the method according to the invention is that by means of it the hygroscopic material can be modified in such a way that the modified hygroscopic material better meets the quality requirements of an end-user which products raw-material has specific requirements in respect of dimensional stability and accuracy as well as mechanical properties and moisture content.

BRIEF DESCRIPTION OF THE DRAWINGS

In the following, the invention is described in more detail with reference to the appended drawing showing a vertical cross-section of a modification apparatus being used in an embodiment of the method according to the invention.

DETAILED DESCRIPTION OF SOME ADVANTAGEOUS EMBODIMENTS OF THE INVENTION

Modification of a hygroscopic material is meant in this patent application a process wherein at least the moisture content of the hygroscopic material is changed. However, modification of the hygroscopic material may include also other process steps which change some other properties of the hygroscopic material than its moisture content such as density, hardness and strength of the material.

Batch of the hygroscopic material is meant in this patent application one or more pieces of hygroscopic material which have been placed adjacent to each other and/or one on the other such a way that there may be or may not be one or more intermediate pieces in between each or some rows and/or columns of the pieces of the hygroscopic material. These intermediate pieces are preferably cell-like boards, plates or stickers having hollow spaces or channels through which air being blown in the modification chamber can flow.

The structure of the cells may vary in different embodiments. However, some or all of the intermediate pieces may be also solid plates, boards or stickers without any air channels.

The material of the intermediate pieces is preferably some hard material, such as metal or composite based material that has good thermal conductivity which aids to reach uniform temperature through the whole batch during the modification. The material of the intermediate pieces should also be such that the intermediate pieces stand in such hot and wet conditions as they experience in a modification chamber of a modification apparatus during modification.

An embodiment of a modification apparatus 10 according to the invention shown in the FIG. 1 comprises a modification chamber 11 in to which a batch of hygroscopic material 15 can be placed when it is modified. In the modification chamber 11 there is a compressing device 12 which has a first compressing member 13 and a second compressing member 14 between which the batch of the hygroscopic material 15 to be modified is placed and by means of which it can be compressed during the modification. The first compressing member 13 and the second compressing member 14 are platform-like elements which have flat compressing surfaces between which the material to be modified can be placed when the material is modified. In this embodiment the compression device has only two compressing members and thus it can be applied for compressing the material to be modified in thickness direction of the pieces of the hygroscopic material. However, in this and in some other embodiments of the method and apparatus the compressing device may have also further compressing members for compressing the pieces of the hygroscopic material also in other directions i.e. in width and/or length directions.

In the batches of hygroscopic material being placed in to the modification chamber 11 one or more intermediate pieces 16 may be placed in between the pieces of the hygroscopic material being one on the other in compressing direction of the batch of the hygroscopic material 15. The intermediate pieces 16 may be placed in between each or some rows of the pieces of the hygroscopic material to be modified. The intermediate pieces 16 are considered as part of the modification apparatus and thus, these are taken in to account in determining the weight and volume of the batch of the hygroscopic material 15 by subtracting their weight from the weight of the batch of the hygroscopic material.

There may be also at least one transfer platform and/or trolley in between the batches of the hygroscopic material 15 and/or between the lowest batch of the hygroscopic material 15 and the first compressing member 13. One or more transfer platforms and/or trolleys may be placed between the batches of hygroscopic material 15 also vertically in case if several separate batches of hygroscopic material 15 are compressed horizontally. Transfer platforms and/or trolleys are taken in the account in weight calculations in corresponding manner as the intermediate pieces 16.

The intermediate pieces 16 and/or the transfer platforms and/or trolleys are taken in to account also in determining the volume of the batch of the hygroscopic material 15 by subtracting the thickness of the one or more intermediate pieces 16 and/or transfer platforms and/or trolleys from the distance between the first compressing member 13 and the second compressing member 14 in the compressing direction of the compressing members 13, 14. In such compressing device wherein further compressing members exist the respective dimension (i.e. width or length) in their compressing direction is determined accordingly.

There are also heating means 18, blowing means 19 as well as moisturizing means (not shown in the FIGURE) in the modification chamber 11 of the modification apparatus 10 shown in the FIG. 1. The heating means 19 may be e.g. an electric heater or, biofuel heating device the blowing means 19 is preferably electric operated fan, and the moisturizing means may comprise liquid-spraying and/or steaming devices or apparatuses.

The modification apparatus 10 shown in the FIG. 1 comprises also measurement means for measuring temperature, moisture content of the air and/or hygroscopic material to be modified as well as weight of the hygroscopic material to be modified in the modification apparatus 10. There may be on-line measurement equipment/sensors as well as testing devices/instruments available in connection with the modification apparatus 10. Also separate laboratory measurements can be applied for verification of the determined values of the properties. The laboratory measurements are most preferably applied for such properties of the hygroscopic material as moisture content, hardness and strength of the material. Furthermore, the modification apparatus 10 comprises a control unit to which the on-line measurement means are connected and which is arranged to control compressing device 12, heating means 18, blowing means 19 and moisturizing means at least partly automatically according to the measurement results of the on-line measurement means.

The hygroscopic material to be modified in the modification apparatus 10 shown in the FIG. 1 may be, for instance, wood, wood-plastic composites or some plantae based material. Preferably, these materials are such that they behave corresponding manner than wood when they are modified.

The modification apparatus 10 shown in the FIG. 1 is designed for modification of plurality of pieces of the hygroscopic material in one go. Thus, when the pieces of the material to be modified is handled by the apparatus they are stacked in a batch which is then placed in to the modification chamber 11 between the first compressing member 13 and the second compressing member 14 of the compressing device 12 as shown in the FIG. 1. In the modification apparatus 10 of FIG. 1 compressing device 12 comprises rotatable screws 21 by means of which a compressing frame 22 can be lowered and raised. The compressing frame 22 is then mechanically connected to the second compressing member 14 which can be thereby moved towards to and apart from the first compressing member 13.

The properties of the pieces of hygroscopic material to be modified can be determined by the on-line measurement means in real-time before modification and during and/or after the modification in the modification apparatus of FIG. 1. In the apparatus of FIG. 1 at least the weight and volume of the batch of the hygroscopic material 15 can be determined before, during and/or after the modification.

When using the modification apparatus 10 the pieces of the hygroscopic material 15 to be modified are composed one after another and adjacent to each other on a surface of the first compressing member 13 of a compressing device 12 such that the group of pieces of the material forms a single compressible batch of material having a substantially flat first and second surfaces being opposite to each other and against the first compressing member 13 and the second compressing member 14 of the compressing device 12. Therefore, the batch of the hygroscopic material 15 can be compressed by means of the compressing device 12 such that compressive stress produced distributes evenly on the opposite surfaces of the batch of the hygroscopic material 15 to be handled by the compressing device 12.

The initial weight of the batch of the hygroscopic material (i.e. the weight before modification) 15 may be determined by measuring weight of the modification apparatus 10 with the batch of the hygroscopic material, or by measuring some part of the modification apparatus with the batch of the hygroscopic material 15 or by measuring mere batch of the hygroscopic material before modification depending on which parts of the modification apparatus is accompanied to the weight measurement. In case the weight is measured with the whole modification apparatus 10 the weight of the batch of the hygroscopic material 15 is calculated by subtracting the weight of the mere modification apparatus 10 from the measured weight of the modification apparatus 10 with the batch of the hygroscopic material 15. In case the initial weight is measured with some part of the modification apparatus the initial weight of the batch of the hygroscopic material is calculated by subtracting the weight of the respective part of the modification apparatus 10 from weight of the respective part of the modification apparatus with batch of the hygroscopic material 15. For instance, in the apparatus shown in the FIG. 1 the initial weight of the hygroscopic material 15 is measured by measuring the weight of the batch of the hygroscopic material. If the weight measurement is carried out during the compression of the compressing device 12 the compression is temporarily released during the time when the measurement is carried out. It may be also carry out the measurement such that compression is not released. In such case the compressing force of the compressing device 12 is subtracted from the weight value obtained from the measurement. In the apparatus shown in the FIG. 1 the compression force could be measured e.g. by means of one or more strain gauges placed in connection of the compressing screws 21 and/or compressing frame 22 of the compressing device 12.

For determining initial volume of the batch of the hygroscopic material 15 (i.e. the volume before modification) the first compressing member 13 and the second compressing member 14 are moved towards each other such that the first compressing member 13 becomes against the first side of the batch of the hygroscopic material 15 and the second compressing member 14 becomes against the second side of the batch of the hygroscopic material 15 and that the batch of the hygroscopic material 15 is compressed lightly such a way that the hygroscopic material pieces will straighten and all the clearances between the each pieces of the hygroscopic material as well as clearances between the compressing members 13 and 14 and the batch of the hygroscopic material 15 are removed. Thereafter, distance between the first compressing member 13 and the second compressing member 14 is measured and registered as height of the batch of hygroscopic material 15. The initial volume of the batch of hygroscopic material can be then calculated by using the measured height of the batch pieces of hygroscopic material 15. The other dimensions of the batch of the hygroscopic material 15 can be determined e.g. correspondingly or they are previously known through their dimensions (i.e. length, width and thickness).

The weight of the batch of the dry hygroscopic material can be determined by multiplying the determined initial volume of batch of the hygroscopic material 15 by the density of such hygroscopic material when it is dry.

Amount of water in the batch of the hygroscopic material 15 before modification can be determined by subtracting the weight of the batch of the dry hygroscopic material from measured weight of the batch of the hygroscopic material 15. Average initial moisture content of the batch of the hygroscopic material 15 (i.e. moisture content before modification) can be then determined from determined amount of water by dividing the weight of the water in the batch of the hygroscopic material by the calculated weight of the batch of the dry hygroscopic material. From the determined amount of water in the batch of the hygroscopic material 15 it is also possible to determine e.g. a theoretical minimum amount thermal energy required for drying the batch of the hygroscopic material 15 to a desired final moisture content.

Average initial density of the batch of the hygroscopic material 15 (i.e. density before the modification) can be determined by dividing the determined initial weight of the batch of the hygroscopic material 15 by the determined initial volume of the batch of the hygroscopic material 15.

During the modification the pieces of the hygroscopic material can be compressed by the compressing device 12. In the compression the first compressing member 13 and the second compressing member 14 of the compressing device 12 are moved towards to each other such that batch of the hygroscopic material 15 is compressed. During and/or after the batch of the hygroscopic material 15 is compressed the distance between the first compressing member 13 and the second compressing member 14 is measured and registered as height of the batch of hygroscopic material during and/or after compression. Compression causes that the volume of the batch of the hygroscopic material 15 change. Compression causes also that some water is removed from the pieces of the hygroscopic material. Thus, the compression causes that moisture content of the pieces of the hygroscopic material reduces. During the modification the moisture content of the batch of the hygroscopic material 15 can be also reduced or increased by changing the temperature and moisture content of the air in the modification chamber 11. Thus, in the modification the hygroscopic material to be modified can be dried or moisturized as well as the weight and density of the hygroscopic material can be changed.

The weight of the batch of the hygroscopic material 15 during and/or after modification is determined e.g. by measuring weight of the modification apparatus 10 or some part of it with the batch of the hygroscopic material 15 or by measuring the weight of the mere batch of the hygroscopic material during and/or after modification. In case the weight of the whole modification apparatus is measured or some part of it the weight of the batch of the hygroscopic material is calculated by applying the same principle as described above in connection with determination of the initial weight of the batch of the hygroscopic material.

For measuring the weight of the batch of the hygroscopic material 15 by the modification apparatus 10 shown in the FIG. 1 the modification apparatus 10 comprises one or more weight sensors 17 which have been placed between the supporting frame 20 and the second compressing member 13 of the modification apparatus 10 as it is shown in the FIG. 1. Thus, in this apparatus these weight sensors 17 measure also compression force of the compressing device 12. Hence, in case if the weight of the batch of the hygroscopic material is measured during compression the compression is temporarily released and the values of the weight sensors 17 are read during time when the compression force is not applied. Alternatively, the weigh measurement during compression can be carried out by reading the values of the sensors during compression and by subtracting the compressing force from the measured values. In that case the compressing force may be measured by additional sensors, such as strain gauges as described above. Weight sensors 17 can be any kind of sensors (e.g. pressure sensors) by means of which force caused by the weight of the batch of the hygroscopic material (with or without compressing force) can be determined.

The volume of the batch of hygroscopic material 15 during and/or after the modification is calculated by using the measured height of the batch pieces of hygroscopic material 15 during and/or after the compression. The change of the volume of the batch of the hygroscopic material 15 during and/or after modification can be calculated by subtracting the determined volume of the batch of the hygroscopic material during and/or after the compression from the initial volume of the batch of the hygroscopic material 15.

Average change of the density of the pieces of the hygroscopic material during and/or after modification can be calculated by subtracting the determined average density of the pieces of the hygroscopic material during and/or after the modification from the average density of the of the pieces of the hygroscopic material before the modification. Thus, e.g. average change of the hardness and/or strength of the material of the pieces of the hygroscopic material during and/or after modification can be calculated by using average change of the density of the batch of the hygroscopic material during and/or after modification.

The values obtained for all the above described physical quantities and properties can be determined also by using manual testing and measurements for the batch of the hygroscopic material 15. Thus, by means of the values obtained from these manual measurements/tests may be used in the control unit of the modification apparatus 10 to provide empirical correction coefficients and/or functions for correction systematic errors or inaccuracy in such measurements and/or for calibrating of the on-line measurements such that appropriate measurement accuracy and reliability is achieved e.g. for controlling the modification process to produce end products having desired properties and quality.

The method and apparatus according to the present invention are not limited to the embodiments described above but can be varied within the scope of the appended claims.

The invention claimed is:

1. A modification apparatus for determining properties of hygroscopic material in real-time during modification wherein pieces of the hydroscopic material to be modified are stacked and a batch of the hygroscopic material being thereby formed is placed in a modification chamber, and in addition to the modification chamber, the modification apparatus comprises a compressing device having compressing members which are compressible in a moving direction against each other and between which the batch of the hygroscopic material to be modified is placeable, and the compressing members are moveable against the opposite ends of the batch of the hygroscopic material such that the batch of the hygroscopic material is compressed by the compressing device and that the volume of the batch of the hygroscopic material is determined during and/or after the compression of the batch of the hygroscopic material, characterized in that the modification apparatus further comprises one or more sensors for measuring the weight of the batch of the hygroscopic material before the modification and/or at least once during and/or after the modification; and the following set of meters to be used before the modification and/or during and/or after the modification:
a first meter for determining the volume of the batch of the hygroscopic material by determining the volume of the batch of the hygroscopic material;
a second meter for determining the weight of the batch of corresponding dry hygroscopic material by multiplying the determined volume of the batch of the hygroscopic material by the density of the corresponding dry hygroscopic material;
a third meter for determining the amount of water in the batch of the hygroscopic material by subtracting the calculated weight of the batch of the corresponding dry hygroscopic material from the measured weight of the batch of the hygroscopic material;
a fourth meter for determining average moisture content of the batch of the hygroscopic material from the determined amount of water in the batch of the hygroscopic material.

2. The modification apparatus according to claim 1,
characterized in that the set of means to be used before the modification and/or during and/or after the modification further comprises:
means for determining an average density of the hygroscopic material to be modified by dividing the determined weight of the batch of the hygroscopic material before and/or during and/or after the modification by the determined volume of the batch of the hygroscopic material at the corresponding phase.

3. The modification apparatus according to claim 1,
characterized in that a distance between the compressing members in the moving direction of the compressing members is measured by the modification apparatus and the said distance is used in determining an initial volume of the batch of the hygroscopic material.

4. The modification apparatus according to claim 1,
characterized in that the change of the volume of the batch of the hygroscopic material is calculated by subtracting the determined volume of the batch of the hygroscopic material during and/or after the compression from an initial volume of the batch of the hygroscopic material before the modification.

5. The method according to claim 2, characterized in that the average density of the hygroscopic material to be modified is determined at least once during and/or after the compression from the determined volume of the batch of the hygroscopic material during and/or after the compression.

6. The modification apparatus according to claim 1,
characterized in that the distance between the compression members in the moving direction of the compressing members during and/or after the compression is measured by the modification apparatus and the said measured distance is used in determining the volume of the batch of the hygroscopic material during and/or after the compression.

* * * * *